Nov. 21, 1950   W. SCHAELCHLIN   2,530,997
STARTING CONTROL SYSTEM FOR SYNCHRONOUS MOTORS
Filed May 28, 1947   3 Sheets-Sheet 1

WITNESSES:
Robert C. Baird
Nw. L. Groome

INVENTOR
Walter Schaelchlin.
BY
Paul E. Friedemann
ATTORNEY

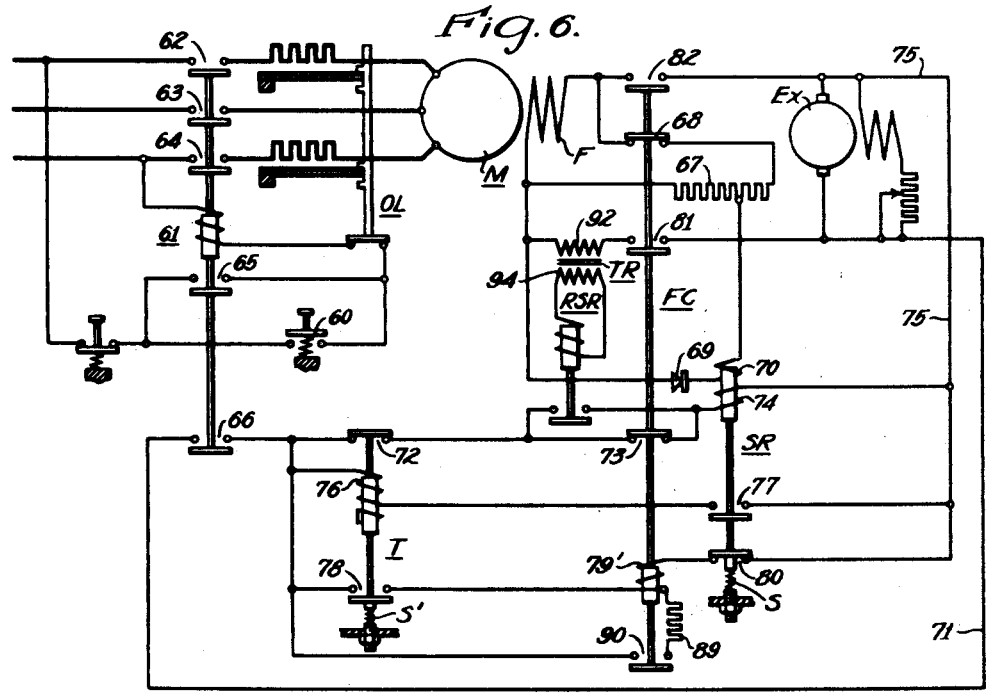

Patented Nov. 21, 1950

2,530,997

UNITED STATES PATENT OFFICE 2,530,997

STARTING CONTROL SYSTEM FOR SYNCHRONOUS MOTORS

Walter Schaelchlin, Pittsburgh, Pa., assignor to Westinghouse Electric Corporation, East Pittsburgh, Pa., a corporation of Pennsylvania Application May 28, 1947, Serial No. 751,022

1 Claim. (Cl. 318—167)

My invention relates to electric systems of control for electric motors, and more particularly to systems for automatically starting—accelerating and synchronizing—synchronous motors.

It is well known and usual practice to start a synchronous motor as an induction motor on the damper windings and at the balancing speed to transfer the motor from induction motor operation to synchronous motor operation. Various automatic control systems are well known to those skilled in the art. With most of such automatic starting control systems, no provision is made to eliminate the undesirable surges occasioned, or produced, in the supply circuit during such transfer, or transition, of the motor from induction motor operation to synchronous motor operation. Furthermore, such transition not only produces the surges mentioned but also produces mechanical shocks to the motor, the load coupled to the motor, and to the generator of the supply system.

A still more undesirable feature of prior art control systems is that they frequently fail to synchronize the motor because the pull-in torque that is developed by the motor at the instant the field winding is supplied with direct current may be less than the torque required by the load. The motor thus fails to synchronize even though the normal torque required by the load is less than the maximum torque against which the motor will synchronize if the proper instant were selected for the field excitation. When the field is excited, and no synchronization takes place, the surges and shocks are repeated continually until the overload devices remove the load. In the meantime, the damper winding may be damaged or completely burned out. It is thus apparent that the motor could normally drive the load if the transition moment from induction motor operation to synchronous motor operation is so selected, at the balancing speed, that the pole pieces hold the most favorable position with reference to the rotating field in the armature, or primary winding of the motor.

I am also aware that control schemes are known which, with some small measure of success, do select the proper angle between the pole pieces and the rotating flux in the armature windings. Such control schemes are usually expensive and worst of all are not reliable in selecting the most favorable angle. Often such schemes have no power to differentiate beween the worst angle and the most favorable angle and proper synchronization then becomes a matter of a one-out-of-two chance. If conditions were right at the moment of transition, all is "good and well" if not the machine slips one or more poles before synchronizing. If it does not synchronize, which is more likely to be the case a new trial must be made, still subject to the same chance.

One broad object of my invention, therefore, is to provide for effectively controlling the time of excitation of the field windings with reference to the rotating flux in the stator.

Another object of my invention is the selection of the maximum pull-in torque for synchronization of a synchronous motor.

It is an important and somewhat more specific object of my invention to select a particular point of a particular slip cycle of a synchronous motor for the excitation of the field windings with direct current in such manner as to provide a given polarity on given pairs of alternate poles.

It is also an object of my invention to provide for automatic resynchronization of a synchronous motor after pull-out so as to automatically obtain maximum pull-in torque.

A further object of my invention is the provision of load responsive resynchronizing means for a synchronous motor that differentiate between the normally heavy starting current and the heavy pull-out current and select only the latter in starting the synchronizing cycle.

It is also an object of my invention to protect the damper winding in case heavy load currents persist preventing normal synchronization or normal resynchronization.

The objects hereinbefore stated are merely illustrative. Many other objects and advantages will become apparent from a study of the following specification and the drawings, in which:

Figs. 6 and 7 are diagrammatic showing of two preferred embodiments of my invention.

Figure 1:
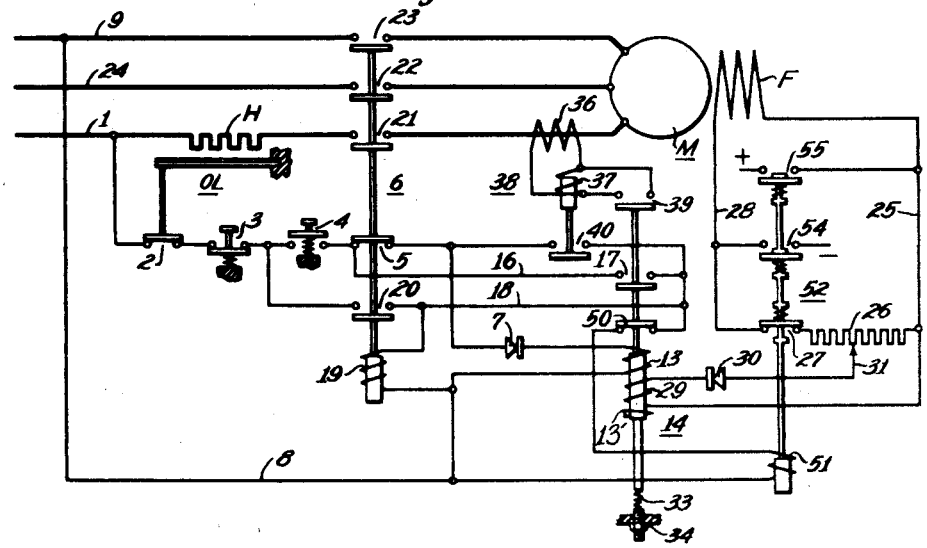
Figure 1 is a diagrammatic showing of an embodiment of my system of control.
Figure 4:
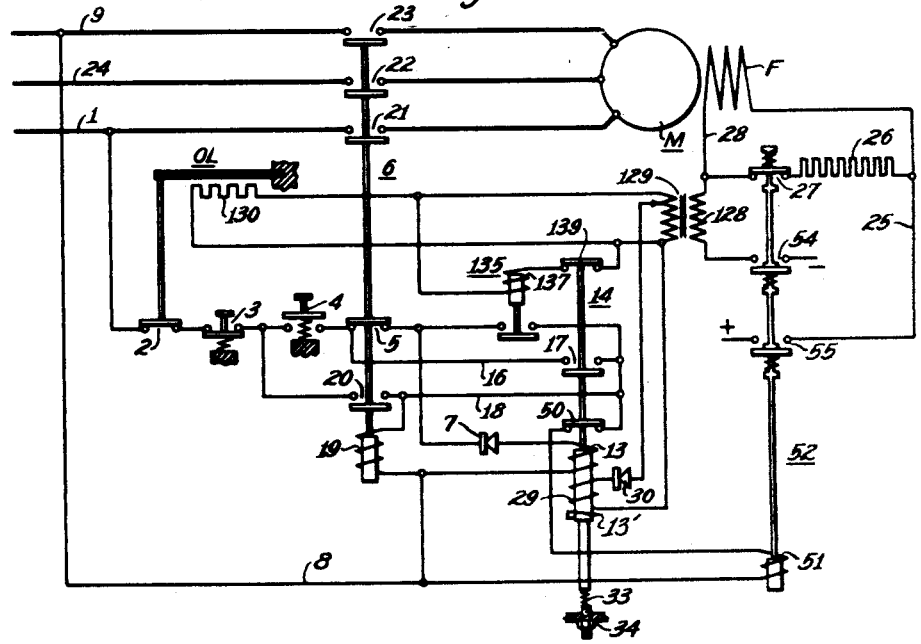
Figs. 4 and 5 are diagrammatic showings of two modifications of my invention.
Figure 5:
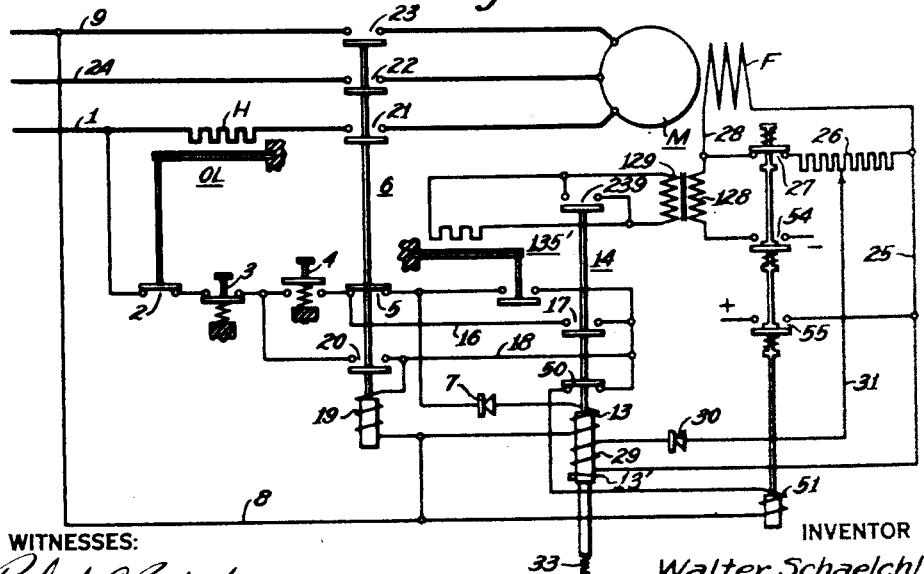

In Figs. 1, 4 and 5, M designates the synchronous motor of generally conventional design having a field winding F and the usual damper winding, not shown.

A line switch 6 is disposed to connect the motor M to the alternating-current buses 1, 24 and 9. The arrangement of the control is such that the field frequency relay 14 is operated by means of a main coil 13 before the line switch, or contactor 6 is operated. The instant the line contactor 6 operates, the main coil 13 is deenergized.

Relay 14 is of the inductive time delay type having the closed circuit winding 13' and thus remains in its operated position sufficiently long so that the holding coil 29 becomes energized by the unidirectional pulses of current supplied from the field F through the rectifier 30. The coil 29 is so selected and so connected to the field discharge resistor that its holding effect is a function of the field frequency and the voltage of the field frequency current.

The importance of this function of coil 29 will become more apparent from a study of the operation of my system of control.

The operation of my system of control as shown in Fig. 1 is as follows:

To start the synchronous motor M, the attendant operates the start push-button 4 whereupon a circuit is established from bus 1 through the closed contacts 2 of the overload protective device OL, the stop push-button 3, the start push-button 4, back contacts 5 of the line contactor 6, the rectifier 7, coil 13 of the frequency relay 14 and conductor 8 to the bus 9.

The energization of the winding 13 of the frequency relay causes the closing of contacts 17 and 39 and the opening of contacts 50. The closure of contacts 17 causes an energizing circuit to be established from bus 1 through contacts 2 of the overload device OL, stop push-button 3, start push-button 4, conductor 16, contacts 17, conductor 18 actuating coil 19 of the line contactor 6 to the energized conductor 8.

The line contactor 6 is thus operated and effects the closing of contacts 21, 22, and 23 to connect the motor primary to the buses 1, 24, and 9. The instant the motor M is thus supplied with alternating current a current is induced in the field winding F.

Figure 2:
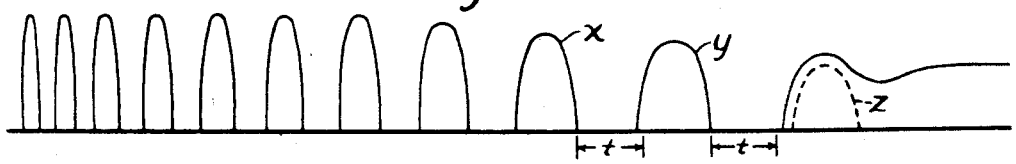
Figs. 2 and 2a are diagrammatic showings of the manner in which the field frequency current pulsations vary, near the balancing speed, in a coil of the field frequency relay embodied in my system of control.

The high frequency current in the field discharges through the discharge resistor 26 by a circuit that may be traced from one slip ring of the field F through conductor 25, discharge resistor 26, back contacts 27 on the field contactor 52 and conductor 28 to the other slip ring for the field F. There is thus a definite voltage drop across discharge resistor 26. To energize the field frequency relay with this variable frequency variable voltage field current I connect the main, or holding coil 29 to the resistor 26 through the adjustable lead 31 and the rectifier 30. The coil 29 is thus energized by a current that varies in frequency as indicated by Fig. 2 and varies in voltage with reference to frequency as indicated in Fig. 3.

The operation of the main contactor 6 caused the opening of contacts 5 and the closing of contacts 20. The closing of contacts 20 merely provides a holding circuit for coil 19, but the opening of contacts 5 opens the circuit for coil 13 of the field frequency relay 14. Since this relay has an inductive time constant, it will remain picked up long enough for coil 29 to become energized to thus maintain the operated condition of relay 14. The time constant may be adjusted by screw 34 changing the tension of spring 33.

The operation of relay 14 in closing contacts 39 effects the shunting of coil 37 of the relay 38 energized from the current transformer 36 to thus be normally responsive to surges in the motor armature current. Since coil 37 is shorted by the contacts 29, relay 38 will not operate by the surge of heavy starting current. Contacts 40 thus will be open during normal starting.

Figure 3:
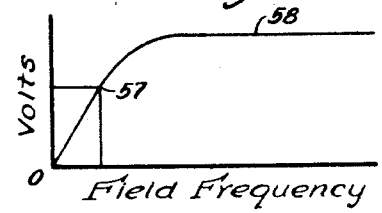
Fig. 3 illustrates a curve showing the voltage variations in the field windings of a synchronous motor as it approaches synchronism.

The frequency relay 14 is so designed and its characteristics so selected that at some specified low frequency and voltage as point 57 on the voltage curve 58 shown in Fig. 3, the relay 14 will drop out, and in so doing will open contacts 39 and 17, and close contacts 50. The opening of contacts 17 is of no particular significance at this time since the shunting contacts 20 remain closed. The opening of contacts 39 places the relay 38 in operative condition so that this relay will operate as a function of pull-out current surges.

Figure 2A:
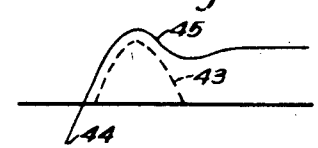

The closing of contacts 50 establishes a circuit from the energized conductor 18 through contacts 50 and coil 51 of the field contactor 52 to the energized conductor 8. The adjustment and design of the frequency relay and field contactor 52 is such that contacts 54 and 55 close at an instant to obtain maximum pull-in torque. For most motors the field build-up characteristics are such that a closure of contacts 54 and 55 occurs when the alternating current is a point 44. See Fig. 2a. The succeeding positive half cycle 43 will have substantially the relation shown to the current changes as curve 45, that take place in the field F.

The operation of the field contactor as above mentioned establishes a circuit from the positive terminal through contacts 55, the field F, conductor 28 and contacts 54 to the negative terminal. The design of the field contactor is such that contacts 54 and 55 close an instant before contacts 27 open upon pick-up of contactor 52 and such that contacts 27 close an instant before contacts 54 and 55 open upon drop-out of the field contactor.

In the event of a pull-out of the motor the relay 38 operates to close the contacts 40. The closure of contacts 40 establishes a circuit from the energized conductor 18 through contacts 40, rectifier 7, and coil 13 of the frequency relay 14 to the energized conductor 8. The frequency relay 14 picks up thus opening contacts 50. The opening of contacts 50 removes the direct current excitation from the field F, because the deenergization of coil 51 causes the field contactor 52 to drop out.

The motor thus operates as an induction motor with the result that coil 29 is again energized by pulses of unidirectional current from the field F. The shunting of coil 37 by contacts 39 again deenergized coil 37. The result is that resynchronization again proceeds in the same manner as during the initial starting.

In case of continued excessive loading of the motor, the overload relay OL, which may be of any convenient design, operates to open contacts 2 to thus effect the stopping of the motor M by the deenergization of the entire control system.

The subject matter shown in Fig. 4 embodies many of the same elements shown in Fig. 1, and such elements as are the same are therefore designated by the same reference characters. The operation of the systems shown in Figs. 4 and 5 need not be given in detail since the discussion in connection with Fig. 1, will suffice.

It should be noted that I place the primary 128 of a transformer in the circuit of the field winding. The secondary 129 of the transformer is connected to energize the resynchronizing relay 135 through the coil 137 controlled by the contacts 138 on the relay 14, the coil 29 of relay 14, and the heating resistor 130 of the overload relay OL.

This latter arrangement has some economic advantages over the showing in Fig. 1 and, what is more important, provides protection for the damper windings of the synchronous motor. Repeated attempts to synchronize on pull-out will be sensed by the overload device which will thus effect the removal of the motor M from the supply buses before serious damage is done to the damper windings.

In the modification shown in Fig. 5, the overload relay OL is subject to the heating resistor H like the showing in Fig. 1. The resynchronizing relay 135' has the heating resistor H but this resistor is deenergized by a shunt switch 239 on relay 14. This is an advantage on pullout since the heating resistor energization begins the instant a pull-out occurs and does not have to wait till relay 14 is operated.

The resynchronizing relay 135' has another advantage over the resynchronizing relay 38 by providing a time delay during normal starting. At the instant the contacts 21, 22 and 23 close, there often is a very high transient current. This high transient current, lasting usually no more than one or two cycles, may at times be sufficient in value to cause operation of relay 38. Once the relay has operated, the normal load currents may suffice to hold the armature of this relay in the operated position. Coil 13 thus remains energized and normal synchronization with minimum pull-in torque may not be obtained.

With relay 135' the thermostatic strip of this relay is not operated immediately no matter how high the transient current values may be during the starting cycles. Normal synchronization is thus always effected. During resynchronizing the delay of relay 135' is not needed and may be a slight disadvantage over relay 38. The choice to be made as between relays 38 and 135 depends on the application made, namely the type of load characteristic the motor is called upon to handle.

In Figs. 6 and 7, M designates a conventional synchronous motor having primary windings, the field windings and damper windings not shown. The starting contactor means, generally designated by 61, includes the line contactor, suitable push-buttons and overload protective means.

To fully appreciate the contribution to the art I have made, a study of typical operating cycles of my system may be most helpful.

To start the motor M the attendant actuates the start push-button 60. This causes the energization of the line contactor 61 by the circuit shown. The operation of the line contactor closes the contacts 62, 63, 64, 65 and 66. The closure of contacts 62, 63 and 64 connects the primary of the motor M to the alternating current buses shown and in consequence the motor starts as an induction motor. The line contactor 61 holds itself in through contacts 65 and the closure of contacts 66 energizes the control circuits.

As the motor M accelerates, the frequency of the alternating current induced in the field F decreases with the rise in motor speed. This induced alternating current flows in discharge circuit including the discharge resistor 67 and contacts 68 of the field contactor FC.

The drop-out control coil 70 of the synchronizing relay SR is connected in series with the rectifier 69 across a portion of the discharge resistor 67. The current and frequency in coil 70 thus varies as indicated in Fig. 2.

The instant contacts 66 are closed, referring to Fig. 7, a circuit is established from the positive terminal 71 through contacts 66, back contacts 72 of the time limit relay T, back contacts 73 of the field contactor FC, and pick-up coil 74 of the synchronizing relay SR to the negative terminal 75. This synchronizing relay SR picks up in a relatively short time. In doing so it opens contacts 80 and closes contacts 77. The opening of contacts 80 prevents any possible premature operation of the field contactor FC, whereas the closing of contacts 77 establishes a circuit from the positive conductor 71, contacts 66, actuating coil 76 of the time limit relay T and contacts 77 to the negative conductor 75.

The energization of coil 76 causes the opening of contacts 72 to thus effect the deenergization of coil 74 of the synchronizing relay SR. This relay SR does not drop out because coil 70 has in the meantime become energized sufficiently to prevent drop out. Contacts 78 are also closed but this is merely a set-up operation.

Both the synchronizing relay SR and the time limit relay are of the type shown and described in the R. B. Immel Patent No. 2,406,377 issued on August 27, 1946 and entitled "Adjustable Time Limit Device." The synchronizing relay SR, not being provided with a short-circuited winding and, but coupled with a suitable adjustment of the spring means S, thus has a predetermined relatively short drop-out time, as the time $t$ indicated on Fig. 2.

The time limit relay T is provided with the short-circuited winding 76' shown and because of this winding and suitable adjustment of the spring means S' the time constant represents a larger predetermined period than $t$.

From an inspection of Fig. 2 it will be apparent that the time period between successive positive half cycles increases as the motor approaches near synchronous speed. From this change it is clear that there will be two half cycles as $x$ and $y$ having a time period just a trifle less than $t$ but that the time period between $y$ and $z$ will be greater than $t$ by a relatively small value.

Since coil 70 is energized by the pulsations shown in Fig. 2, it is apparent that the synchronizing relay SR will always drop out at or near the beginning of a given positive half cycle, as $z$. This synchronizing relay will thus close contacts at a time represented by point 44. See Fig. 2a. The drop-out of relay SR effects the closing of contacts 80 whereupon a circuit is established from the positive conductor 71 through contacts 66 of the line contactor 61, contacts 78 of the time limit relay T, actuating coil 79 of the field contactor FC, and contacts 80 to the negative conductor 75.

The field contactor FC closes an instant after being energized. The selection and design of this contactor is such that it operates in an extremely short time interval. The operation of the field contactor connects, through the closure of contacts 81 and 82, the field winding F to the positive and negative terminals 71 and 75.

Since the synchronizing relay SR not only picks the right time, namely, the correct motor speed, for operation of the field contactor FC, but also the right point, as 44, on the induced voltage wave it is apparent that the synchronization takes place at an instant to provide maximum pull-in torque. The line disturbance is thus a minimum and shocks on the motor and load are avoided.

The field contactor holds itself in through contacts 90. The opening of contacts 78 a predetermined time after the opening of contacts 77 thus does not prevent operation of the field contactor.

It will be noted that the connection of the field F to conductors 71 and 75 also energizes the primary 92 of the transformer TR. The secondary 94 is connected to energize the actuating coil 85 of the resynchronizing relay RSR. During normal synchronous operation the output of the transformer is zero, but in the event of a pullout, large current fluctuations are produced in the transformer primary and in consequence the resynchronizing relay RSR picks up to close the contacts 86. This operation again energizes the coil 74 because contacts 72 are closed during normal synchronous operation.

Figure 8:
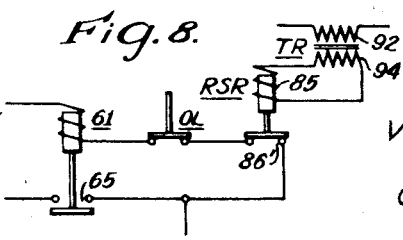
Fig. 8 is a portion of a circuit showing a detail.

The resynchronizing relay may be used to shut down the motor M. In this event, the contacts of this relay RSR, as the contacts 86', are disposed directly in series with the contacts of the overload relay OL controlling the energization of the actuating coil for the line contactor 61. In the event of a pull-out, the line contactor 61 will thus be deenergized to thus open the contacts 62, 63, and 64. The circuit arrangement mentioned in this paragraph is shown in Fig. 8.

The synchronizing relay operates to open the circuit, at contacts 80, for the field contactor FC. The direct current excitation is thus removed from the field and the coil 70 of the synchronizing relay SR is again energized by the alternating current induced in the field winding. Synchronization thus takes place in the manner above discussed.

Whether an exciter as Ex is used or not, depends on plant conditions. In some places a constant voltage direct current supply is available, in others not. When not available an exciter must be used. When an exciter is used, there might be difficulty in getting the field contactor FC to operate properly when the exciter is not yet up to field voltage when both contacts 80 and 78 are closed. The coil 79' is thus so selected that the field contactor operates with the requisite "snap" even though the exciter voltage is still building up, or while the voltage of the exciter may be fluctuating as it is being loaded with the field F.

After stable synchronous operation is attained, the exciter voltage is also stable and at full value. To prevent the low voltage coil 79' from being injured and yet obtain the required holding force, I utilize a resistor 89 in the holding circuit for coil 79'.

While I have shown and described but one basic embodiment of my invention and two modifications, I do not wish to be limited to the exact disclosure made but wish to be limited only by the scope of the claim hereto appended.

I claim as my invention:

In a synchronous motor starting control scheme of the type described, the combination of a synchronous motor having an armature winding and a field winding, a plurality of terminal leads normally energized with alternating current, a pair of terminal leads normally energized with direct current, an inductive time limit relay having an armature and adjustable spring means for biasing the armature to the drop-out position by a selected force, a main coil for operating the armature to the pickup position, a line contactor for effecting the connection of the motor armature to the plurality of terminals to thus energize the armature winding with alternating current, means for energizing the said main coil to cause actuation of the relay armature to its pickup position, means responsive to the operation of the relay armature to the pickup position for effecting the energization of the line contactor, a field contactor for connecting the field winding to the terminals energized with direct current, said time limit relay having a second coil comprising a holding coil interconnected with the motor field winding, a rectifier and variable impedance in series with the holding coil whereby the time limit relay armature is held in its pickup position by pulses of rectified current having a frequency proportional to the motor slip, control means responsive to the operation of the line contactor for deenergizing the main coil of the inductive time limit relay, a resynchronizing relay interconnected with said synchronous motor to be responsive to relatively high motor armature winding currents, means operable by said inductive time limit relay for making said resynchronizing relay inoperative during starting of the motor, said variable impedance in the circuit of the holding coil being adjusted so that the dropout of the inductive time limit relay occurs at an instant having a given time relation to a given point on a given frequency cycle, and means responsive to the dropout of the time limit relay for causing the operation of the field contactor.

WALTER SCHAELCHLIN.

REFERENCES CITED

The following references are of record in the file of this patent:

UNITED STATES PATENTS

| Number | Name | Date |
| --- | --- | --- |
| 1,870,456 | Inman | Aug. 9, 1932 |
| 1,896,074 | Ewing | Feb. 7, 1933 |
| 1,896,093 | McLenegan | Feb. 7, 1933 |
| 2,249,465 | Ewing | July 15, 1941 |
| 2,282,955 | Ewing | May 12, 1942 |
| 2,407,121 | Winter | Sept. 3, 1946 |
| 2,264,863 | Seegar et al. | Dec. 2, 1941 |